(12) United States Patent
Masuda

(10) Patent No.: US 8,965,110 B2
(45) Date of Patent: Feb. 24, 2015

(54) DEVICE AND METHOD FOR MEASURING DIAMETER OF CYLINDRICAL OBJECT

(71) Applicant: FUJIFILM Corporation, Tokyo (JP)

(72) Inventor: Tomonori Masuda, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/259,246

(22) Filed: Apr. 23, 2014

(65) Prior Publication Data

US 2014/0226897 A1 Aug. 14, 2014

Related U.S. Application Data

(63) Continuation of application No. PCT/JP2012/077325, filed on Oct. 23, 2012.

(30) Foreign Application Priority Data

Oct. 24, 2011 (JP) .................................. 2011-232902

(51) Int. Cl.
  *G06K 9/00* (2006.01)
  *G06K 9/46* (2006.01)
  *G01B 11/08* (2006.01)
  *G01C 11/06* (2006.01)
  *G06T 7/60* (2006.01)

(52) U.S. Cl.
  CPC ............ *G06K 9/00201* (2013.01); *G01B 11/08* (2013.01); *G01C 11/06* (2013.01); *G06T 7/602* (2013.01); *G06T 2207/10012* (2013.01)
  USPC .......................................... 382/154; 382/203

(58) Field of Classification Search
  None
  See application file for complete search history.

(56) References Cited

U.S. PATENT DOCUMENTS 4,993,836 A * 2/1991 Furuhashi et al. ............ 356/611

FOREIGN PATENT DOCUMENTS

| JP | 2-97606 U | 8/1990 |
| JP | 6-229725 A | 8/1994 |
| JP | 7-139918 A | 6/1995 |
| JP | 2010-243273 A | 10/2010 |

OTHER PUBLICATIONS

International Search Report, issued in PCT/JP2012/077325, dated Dec. 4, 2012.

(Continued)

*Primary Examiner* — Daniel Mariam
(74) *Attorney, Agent, or Firm* — Birch, Stewart, Kolasch & Birch, LLP

(57) ABSTRACT

Imaging a cylindrical object, left and right viewpoint images are stored to a data memory. To calculate a diameter D of the cylindrical object, a pair of measurement points designated on outlines of the left viewpoint image and corresponding points that are set on outlines of the right viewpoint image in accordance with measurement points are used. While one of the measurement points is fixed on the outline, the other measurement point is scanned on the other outline, such that the distance between the pair of measurement points is minimized. The positions of the corresponding points are updated in synchronization with this. Whenever the corresponding points are updated, the diameter D is calculated, and a minimum value of the calculated diameters is determined as the diameter D of the cylindrical object.

12 Claims, 15 Drawing Sheets

(56) References Cited

OTHER PUBLICATIONS

Written Opinion of the International Search Authority, issued in PCT/JP2012/077325, dated Dec. 4, 2012.

International Preliminary Report on Patentability, and Translation of Written Opinion of the International Searching Authority, dated May 8, 2014, for International Application No. PCT/JP2012/077325 (Forms PCT/IB/338, PCT/IB/373 and PCT/ISA/237).

* cited by examiner

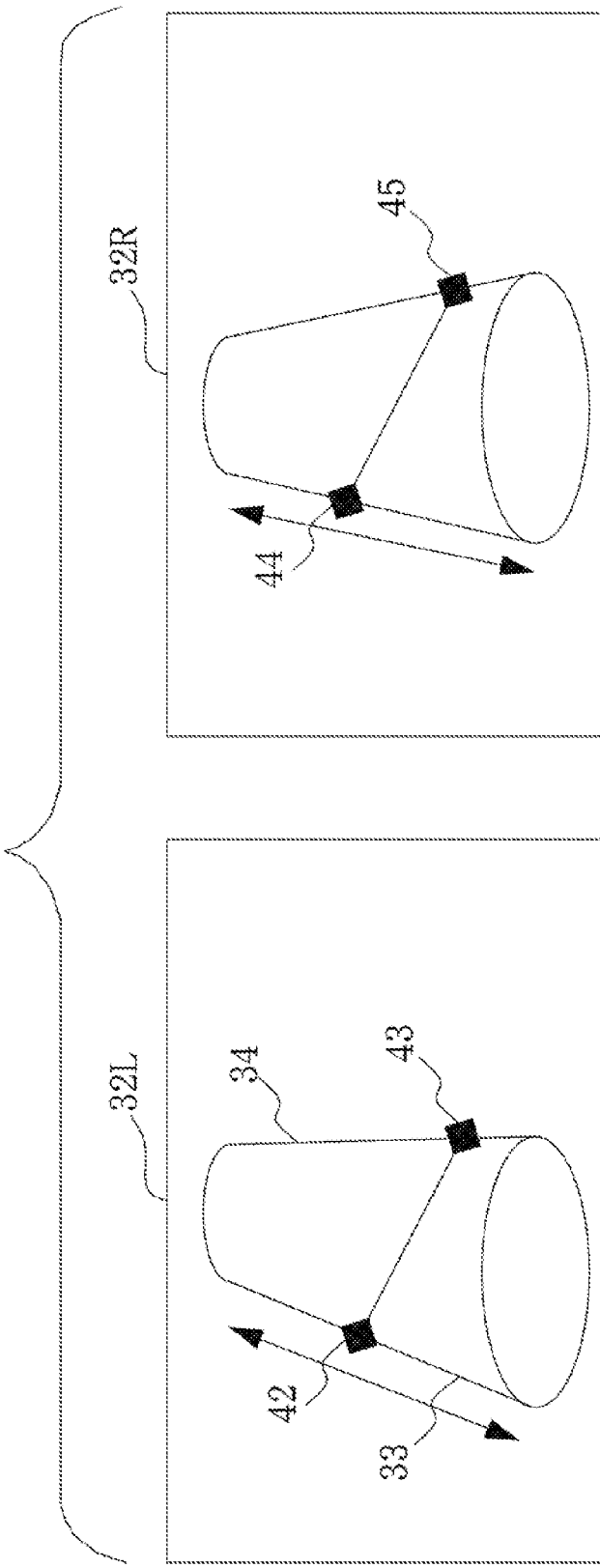

DEVICE AND METHOD FOR MEASURING DIAMETER OF CYLINDRICAL OBJECT

CROSS REFERENCE TO RELATED APPLICATIONS

This non-provisional application is a Continuation of International Application No. PCT/JP2012/077325 filed on Oct. 23, 2012, which claims the benefit of Japan Application No. 2011-232902 filed on Oct. 24, 2011. The entire contents of all of the above applications are hereby incorporated by reference.

BACKGROUND OF THE INVENTION

1. Field of the Invention

The present invention relates to a measuring device and a measuring method for measuring the diameter of a cylindrical object based on a parallax image obtained by making exposures from two viewpoints.

2. Description Related to the Prior Art

Taking a viewpoint image of an observation object from each of two viewpoints a fixed distance apart and indicating a specific point situated on the observation object in each of the viewpoint images allow calculation of a distance from an imaging position to the observation object based on the principle of triangulation, with the use of these viewpoint images as a parallax image.

Likewise, it is also possible to measure the diameter of a cylindrical object by taking two viewpoint images of the cylindrical object from two viewpoints and using the viewpoint images as a parallax image. According to a technique described in Japanese Patent Laid-Open Publication No. 07-139918, a plane orthogonal to a central axis of the cylindrical object is virtually determined from the parallax image. A pair of tangents to a circle, which corresponds to a line of intersection of this plane and a cylindrical surface of the object, is drawn in the plane to obtain the coordinates of each contact point and the coordinates of an intersection point of the pair of tangents. In addition, considering the distance between the two viewpoints, the distance from the imaging position to the cylindrical object, and the like, the diameter of the cylindrical object is calculated.

Also, as is known by Japanese Patent Laid-Open Publication No. 2010-243273, an active method can be used by which viewpoint images are taken from two viewpoints, while light beams are applied to three points situated on the cylindrical object. This method can use light spots of the light beams projected to the cylindrical object together with the parallax image, and has the advantage of permitting the measurement without any inconvenience even if the cylindrical object is inclined in its depth direction.

However, according to the technique described in the Japanese Patent Laid-Open Publication No. 07-139918, an error easily creeps in, in the course of drawing the tangents to each circumferential surface, which is imaged as an outline of the cylindrical object in each viewpoint image, and mathematizing the tangents. Furthermore, in a case where the cylindrical object is imaged in a state of being inclined in a depth direction of the image, an error tends to creep in also in the course of setting the plane orthogonal to the central axis of the cylinder. Also, the technique of the Japanese Patent Laid-Open Publication No. 2010-243273, which has to apply the light beams to a plurality of portions of the observation object, has difficulties such as increase in size of a device and need for much expense in time and effort of initial setting and adjustment.

SUMMARY OF THE INVENTION

An object of the present invention is to provide a measuring device and a measuring method that can measure the diameter of a cylindrical object with high precision based on an easily taken parallax image, even if the position of the cylindrical object whose diameter is to be measured is not specified.

To achieve the above and other objects, a diameter measuring device of a cylindrical object according to the present invention includes a parallax image storage, a parallax image display, an outline detector, a measurement point designator, a corresponding point deriver, a measurement point updater, and a diameter calculator. The parallax image storage stores a first viewpoint image and a second viewpoint image obtained by imaging the cylindrical object from a first viewpoint and a second viewpoint, respectively. The parallax image display displays the first viewpoint image and the second viewpoint image. The outline detector detects in the first viewpoint image a first outline and a second outline of the object that are parallel to a central axis of the object. The measurement point designator designates a first measurement point and a second measurement point on the first and second outlines, respectively. The corresponding point deriver sets in the second viewpoint image a first corresponding point and a second corresponding point that correspond to the first and second measurement points. The measurement point updater scans the second measurement point on the second outline while fixing the first measurement point, and updates the second corresponding point whenever the second measurement point is updated in accordance with a scan position. The diameter calculator calculates a diameter of the object whenever the measurement point updater performs the update, and determines a minimum value of the calculated diameters as the diameter of the object. To increase measurement precision, out of a pair of measurement points set in the first viewpoint image, one having a shorter object distance is preferably designated as the first measurement point.

In a case where in the course of scanning the second measurement point, the second measurement point is across a first measurement frame set in advance in the first viewpoint image or the second corresponding point is across a second measurement frame set in advance in the second viewpoint image, the measurement point updater preferably fixes the second measurement point on the second outline of the first viewpoint image such that the second measurement point and the second corresponding point are confined within the first measurement frame and the second measurement frame, respectively, and updates the first measurement point while scanning the first measurement point on the first outline, and sequentially updates the first corresponding point in the second viewpoint image.

When the measurement point designator designates the first and second measurement points on the first and second outlines of the first viewpoint image, the corresponding point deriver preferably derives the first and second corresponding points corresponding to the first and second measurement points, respectively, in the second viewpoint image by a stereo matching process, and retrieves a first corresponding outline and a second corresponding outline of the second viewpoint image that correspond to the first and second outlines in straight line detection areas having a certain width each of which is set in each of extending directions of a line segment connecting the first and second corresponding points, and updates positions of the first and second corresponding points to positions on the detected first and second corresponding outlines.

After the measurement point designator designates the first and second measurement points on the first and second outlines of the first viewpoint image, the corresponding point deriver derives the first and second corresponding points corresponding to the first and second measurement points, respectively, in the second viewpoint image by a stereo matching process. Then, the corresponding point deriver may change orientations of straight line detection areas having a certain width that are set adjacently to the first corresponding point and the second corresponding point of the second viewpoint image based on a line segment connecting the first measurement point and the second measurement point or an angle $\theta$ of a line segment connecting the first corresponding point and the second corresponding point relative to a parallax direction. Then, the corresponding point deriver may retrieve in the straight line detection area a first corresponding outline and a second corresponding outline of the second viewpoint image that correspond to the first and second outlines, and update positions of the first and second corresponding points to positions on the detected first and second corresponding outlines.

In a case where the angle $\theta$ is 45° or more, the straight line detection area is preferably set under an upper corresponding point and over a lower corresponding point, out of the first and second corresponding points. In a case where the angle $\theta$ is less than 45°, the straight line detection area is preferably set on a right side of a left corresponding point and on a left side of a right corresponding point, out of the first and second corresponding points.

A diameter measuring method of the cylindrical object according to the present invention includes the steps of storing a first viewpoint image and a second viewpoint image obtained by imaging the cylindrical object from a first viewpoint and a second viewpoint; displaying the first viewpoint image and the second viewpoint image; detecting in the first viewpoint image a first outline and a second outline of the object that are parallel to a central axis of the object; designating a first measurement point and a second measurement point on the first and second outlines, respectively; deriving in the second viewpoint image a first corresponding point and a second corresponding point that correspond to the first and second measurement points; scanning the second measurement point on the second outline while fixing the first measurement point, and updating the second corresponding point whenever the second measurement point is updated in accordance with a scan position; and calculating a diameter of the object whenever the update is performed, and determining a minimum value of the calculated diameters as the diameter of the object. Out of a pair of measurement points set in the first viewpoint image, one having a shorter object distance is preferably designated as the first measurement point.

In the updating step of the second corresponding point, in a case where in the course of scanning the second measurement point, the second measurement point is across a first measurement frame set in advance in the first viewpoint image or the second corresponding point is across a second measurement frame set in advance in the second viewpoint image, the second measurement point is preferably fixed on the second outline of the first viewpoint image such that the second measurement point and the second corresponding point are confined within the first measurement frame and the second measurement frame, respectively, and the first measurement point is preferably updated while the first measurement point is scanned on the first outline, and the first corresponding point is sequentially updated in the second viewpoint image.

The deriving step of the first and second corresponding points may further include the steps of deriving the first and second corresponding points, which correspond to the first and second measurement points, respectively, designated on the first and second outlines of the first viewpoint image, in the second viewpoint image by a stereo matching process; retrieving in the second viewpoint image a first corresponding outline and a second corresponding outline that correspond to the first and second outlines within straight line detection areas having a certain width each of which is set in each of extending directions of a line segment connecting the first and second corresponding points; and updating positions of the first and second corresponding points to positions on the detected first and second corresponding outlines.

The deriving step of the first and second corresponding points may further include the steps of deriving the first and second corresponding points that correspond to the first and second measurement points designated in the designating step on the first and second outlines of the first viewpoint image, by a stereo matching process; changing an orientation of a straight line detection area having a certain width that is set adjacently to each of the first corresponding point and the second corresponding point of the second viewpoint image, based on a line segment connecting the first measurement point and the second measurement point or an angle $\theta$ of a line segment connecting the first corresponding point and the second corresponding point relative to a parallax direction; and retrieving a first corresponding outline corresponding to the first outline and a second corresponding outline corresponding to the second outline in the straight line detection areas of the second viewpoint image; and updating positions of the first and second corresponding points to positions on the detected first and second corresponding outlines. In a case where the angle $\theta$ is 45° or more, the straight line detection area may be set under an upper corresponding point and over a lower corresponding point, out of the first and second corresponding points. In a case where the angle $\theta$ is less than 45°, the straight line detection area may be set on a right side of a left corresponding point and on a left side of a right corresponding point, out of the first and second corresponding points.

According to the present invention, a new means that measures the diameter by scanning the measurement point allows measurement of the diameter of the approximate cylinder with high precision, irrespective of the presence or absence of constant relation maintained between the position of the approximately cylindrical object whose diameter is to be measured and the parallax direction, with the use of a simple hand-hold imaging device such as a 3D-capable digital camera for imaging the parallax image.

BRIEF DESCRIPTION OF THE DRAWINGS

For more complete understanding of the present invention, and the advantage thereof, reference is now made to the subsequent descriptions taken in conjunction with the accompanying drawings, in which:

FIG. 9 is an explanatory view showing an example of a parallax image in which the position of the cylindrical object is inclined;

DESCRIPTION OF THE PREFERRED EMBODIMENTS

Figure 1:
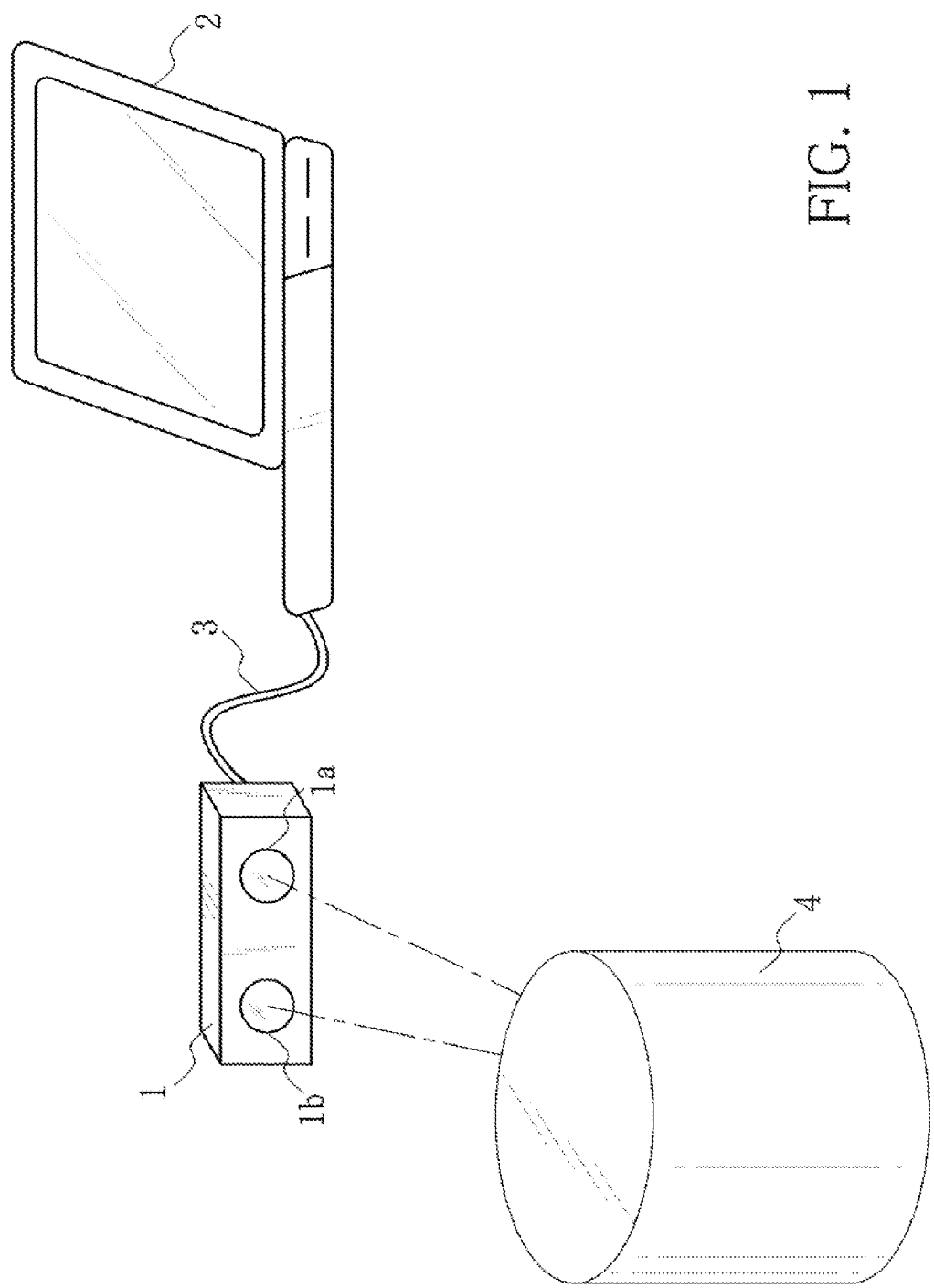
FIG. 1 is a schematic view of a measuring device according to the present invention.

In FIG. 1, a twin-lens stereo camera 1 having parallax in a horizontal direction takes an image of a cylindrical object 4. A left viewpoint image and a right viewpoint image, which have parallax therebetween, are taken independently through each lens 1a, 1b of the stereo camera 1, and recorded to a memory of the stereo camera 1 as image data for composing a parallax image. The stereo camera 1 is automatically in focus when making an exposure. Object distance information that is obtained in focusing is stored with being related to the image data.

Figure 2:
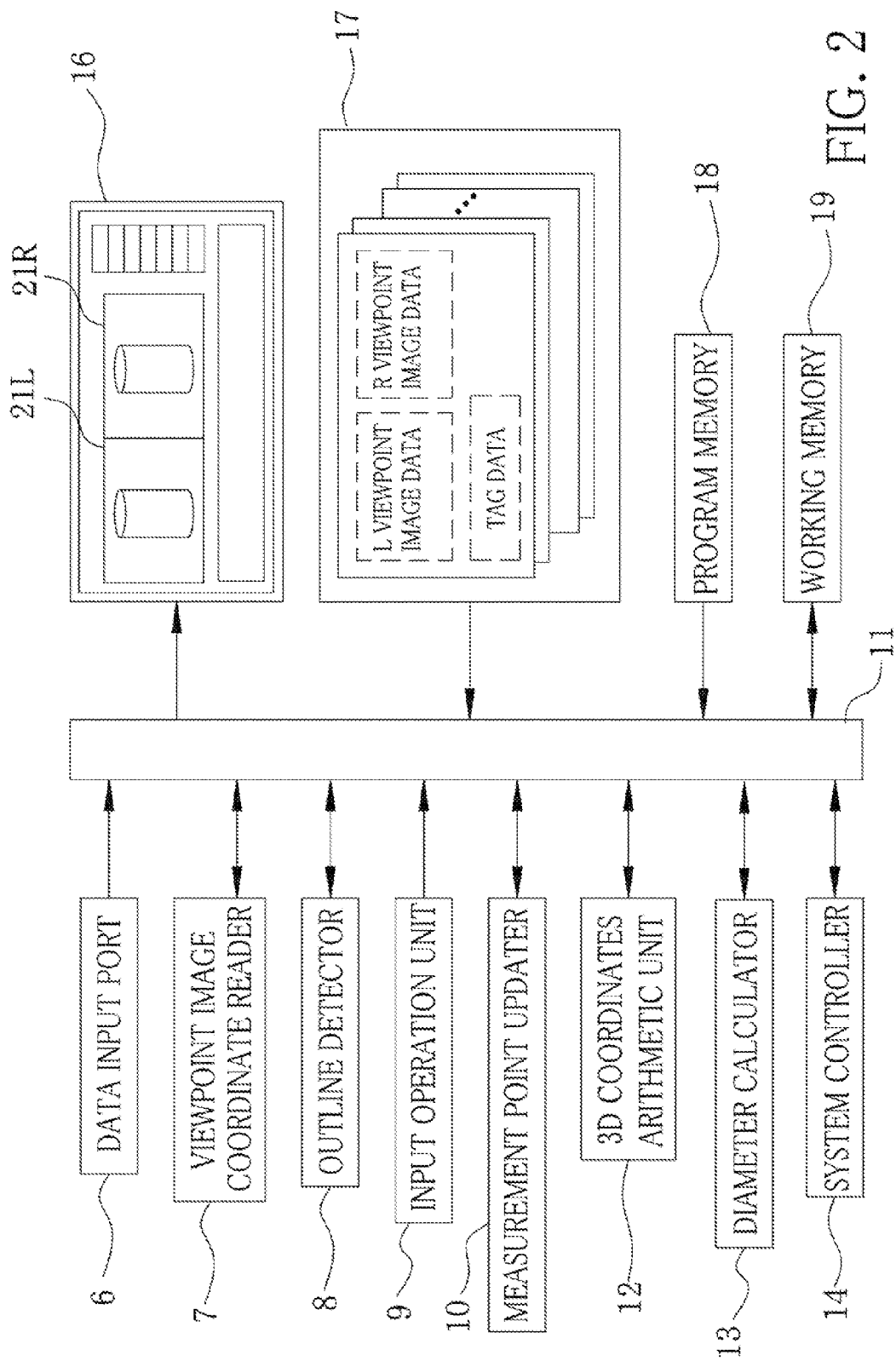
FIG. 2 is a block diagram of the measuring device.

To measure the diameter of the imaged cylindrical object 4, the image data of the parallax image is transferred from the digital camera 1 to a personal computer 2 through a communication cable 3. The personal computer 2 is installed with an application program that calculates the diameter of the cylindrical object 4 based on the parallax image. Running the application program configures functional blocks of a diameter measuring device in the personal computers 2, as shown in FIG. 2. Note that, the cylindrical object is not limited to a circular cylinder shape of strict meaning, but may be an elliptical cylinder whose cross section is substantially regarded as a circle, a circular truncated cone whose top surface and bottom surface have slightly different diameters, or the like.

In FIG. 2, the left viewpoint image data and the right viewpoint image data obtained by the stereo camera 1 are inputted to a data input port 6. The left and right viewpoint image data is stored to a data memory 17 together with tag data, which differs on a viewpoint image basis. The tag data includes various imaging conditions such as information on the distance between principal points of the lenses 1a and 1b, the object distance information, and imaging magnification information.

A viewpoint image coordinate reader 7 reads the coordinates of a point designated in the viewpoint image, based on the left and right viewpoint image data. As the unit of the coordinates, a pixel number of an image sensor for imaging the left and right viewpoint images is used. An outline detector 8 evaluates an image pattern of the cylindrical object 4 formed in the viewpoint image, and detects outlines of a peripheral surface that manifest themselves as a pair of parallel lines. An input operation unit is used as a measurement point designator for setting measurement points on the outlines of the viewpoint image in accordance with an input operation of an operator.

When the measurement points are set in the pair of outlines of the viewpoint image by the input operation of the operator, a measurement point updater 10 shifts (scans) one of the measurement points along the outline. When a pair of measurement points are designated, which measurement point to fix and which measurement point to scan may be selectively determined by the operator, but may be determined automatically in accordance with a designation order, other factors, and the like described later on. By scanning one of the measurement points, the positions of the pair of measurement points are updated so as to minimum the distance between the measurement points. A 3D coordinates arithmetic unit 12 performs a coordinate analysis of the image of the cylindrical object 4 in each viewpoint image, to obtain outline coordinates and central axis coordinates of each viewpoint image, the parallax, and the like. The 3D coordinates arithmetic unit 12 functions as a corresponding point deriver. When the measurement points are set in one of the left and right viewpoint images, the corresponding point deriver sets corresponding points, which correspond to the measurement points, by a stereo matching process on the outlines detected in the other viewpoint image. A diameter calculator 13 calculates the diameter of the cylindrical object 4 in 3D measurement space derived by the 3D coordinates arithmetic unit 12, whenever scanning the measurement point.

These functional blocks are connected to a system controller 14, a program memory 18, and a working memory 19 through a bus 11. The program memory 18 stores the application programs for calculating the diameter of the cylindrical object 4, which include a judgment program for deriving parallax information based on the pair of viewpoint images and recognizing an image of the cylindrical object 4 in each viewpoint image, a sequential program for actuating each of the functional blocks described above in a predetermined order, and the like. The system controller 14 controls the entire performance of the application programs stored in the program memory 18 using the working memory 19.

On an image display 16, the parallax image composed of the left and right viewpoint images is displayed. When the measurement points are inputted, the image display 16 displays the positions of the inputted measurement points on its screen. Note that, the image display 16 also displays the coordinates of the input positions of the measurement points, the position of the diameter that is virtually set in the course of calculation of the diameter, and other various types of data requiring verification. Integrating a touch panel into the image display 16 allows direct input of the measurement points on a display screen that is displaying the parallax image, using a finger or a touch pen.

The operation of the above structure will be described. To calculate the diameter of the cylindrical object 4, first and second viewpoint images viewed from different viewpoints are required. Although the direction of parallax between the first and second viewpoint images is not limited to a horizontal direction, as in the case of the stereo camera 1 shown in FIG. 1, description is presented with the use of a left viewpoint image and a right viewpoint image having parallax in the horizontal direction, as the first viewpoint image and the second viewpoint image composing a parallax image.

Figure 3A:
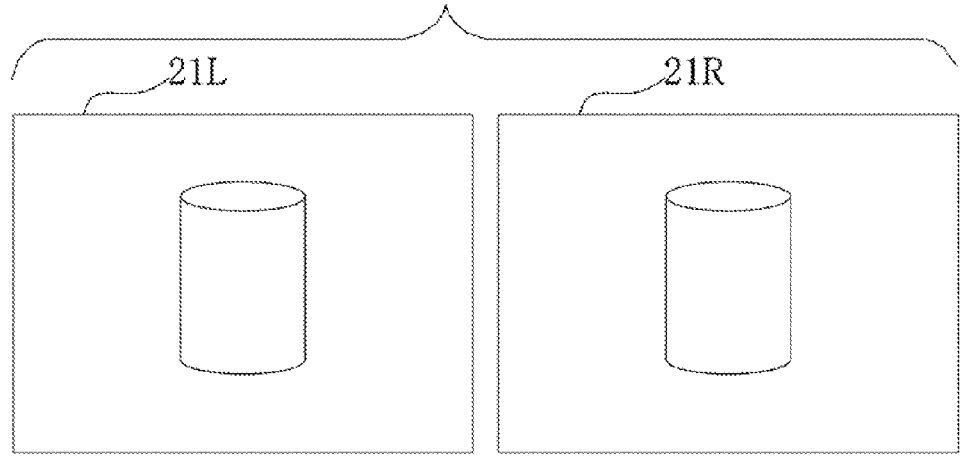
FIGS. 3A to 3C are explanatory views showing examples of a parallax image of a cylindrical object.
Figure 3B:
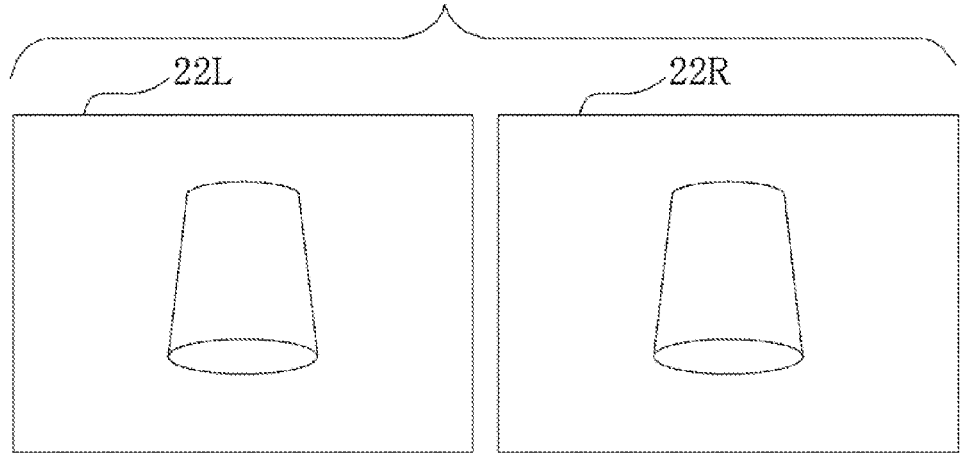
Figure 3C:
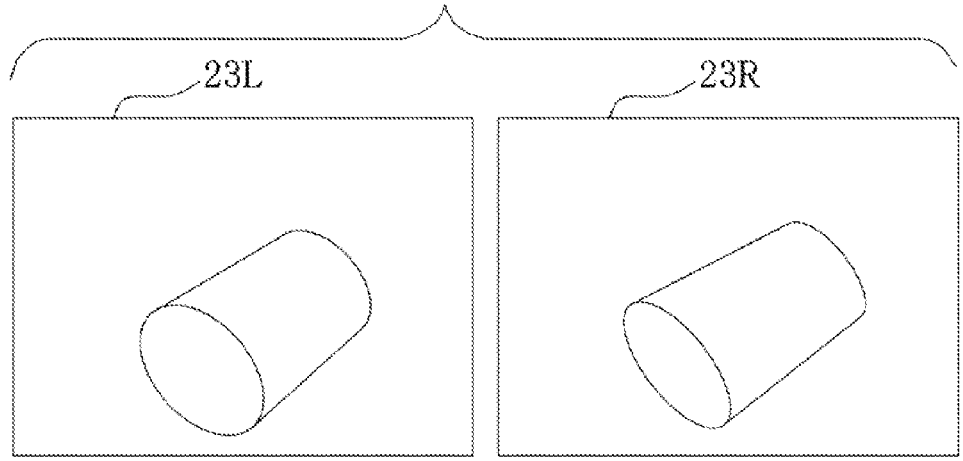

In FIGS. 3A to 3C, images on a left side represent various types of left viewpoint images 21L, 22L, and 23L. Right viewpoint images 21R, 22R, and 23R corresponding to the left viewpoint images 21L, 22L, and 23L are represented on a right side. If the viewpoint shifts vertically or the cylindrical object 4 is imaged in an inclined manner, the shape and the outline of the cylindrical object 4 in the viewpoint image vary between the corresponding left and right viewpoint images 21L and 21R, 22L and 22R, and 23L and 23R. The diameter of the cylindrical object 4 can be calculated from any of these viewpoint image pairs by a processing procedure of FIG. 4.

Figure 4:
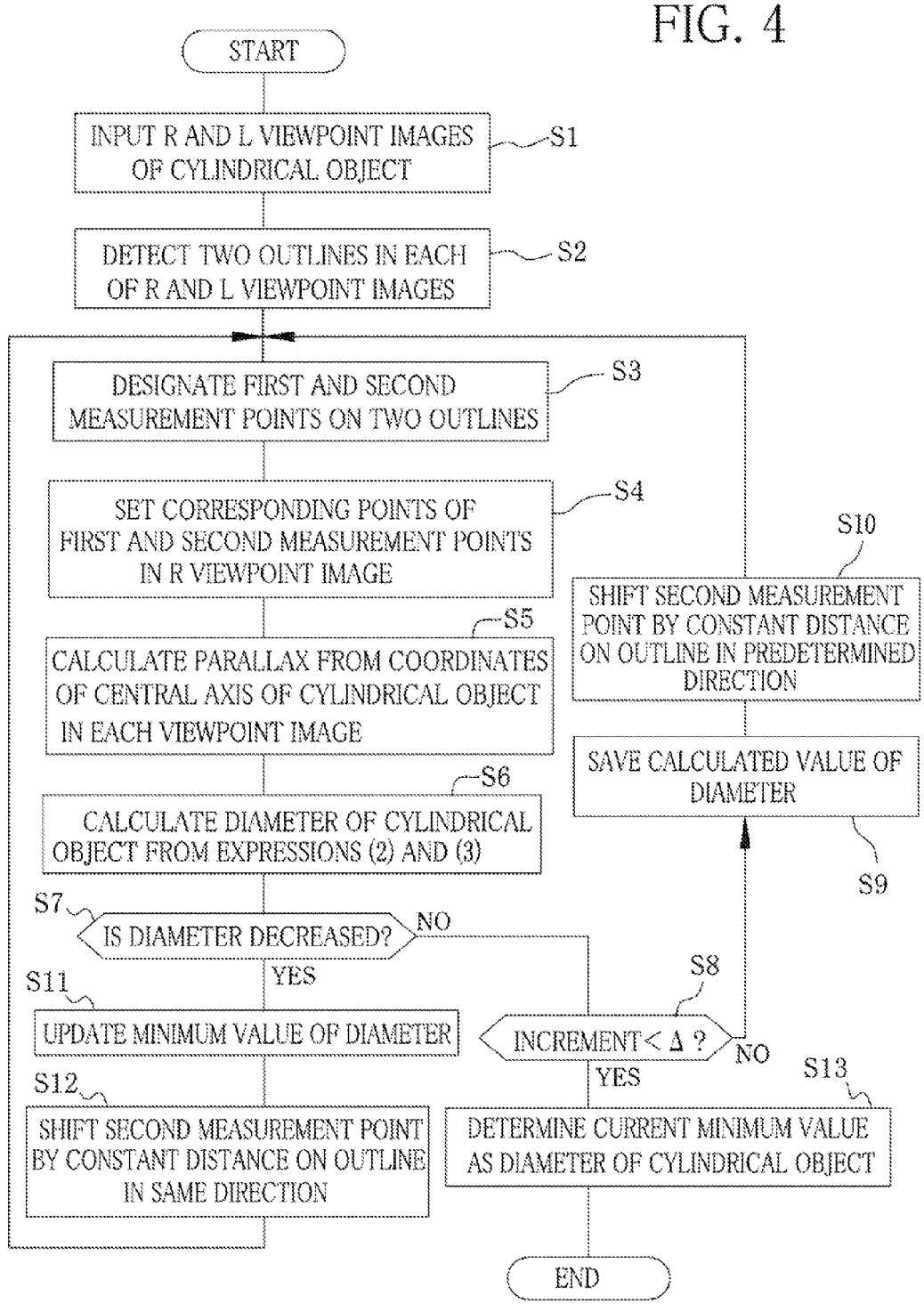
FIG. 4 is a flowchart of a measurement process.

According to FIG. 4, in a data input step S1, the left viewpoint image data and the right viewpoint image data of the cylindrical object 4 taken by the stereo camera 1 is inputted to the data memory 17. Based on the image data stored to the data memory 17, the left viewpoint image 21L and the right viewpoint image 21R of the cylindrical object 4 are displayed side by side at an equal magnification on the image display 16, as shown in FIG. 2.

Figure 5:
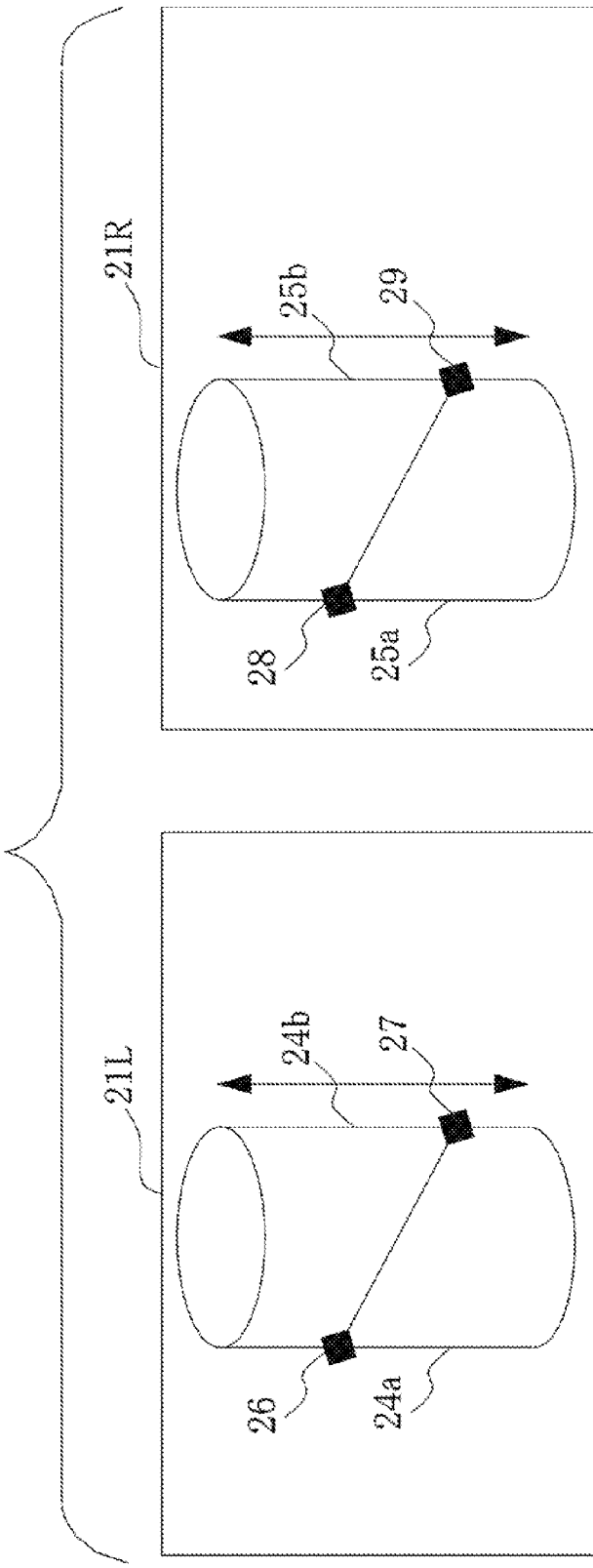
FIG. 5 is an explanatory view showing a state of scanning a measurement point.

In the next outline detection step S2, a pair of outlines formed by the peripheral surface of the cylindrical object 4 is extracted from each of the left viewpoint image 21 and the right viewpoint image 21R. Taking FIG. 5 as an example, a first outline 24a and a second outline 24b that are parallel to each other are detected in the left viewpoint image 21L. A first outline 25a and a second outline 25b are detected in the right viewpoint image 21R. In this example, it is judged by processing the image data that the cylindrical object 4 is vertically erected without having a large depression or elevation angle in the image, so the pair of outlines parallel to the central axis is detected. Note that, in the case of the left and right viewpoint images 22L and 22R as shown in FIG. 3B and the viewpoint images 23L and 23R as shown in FIG. 3C, it is possible to judge the position of the cylindrical object 4 in the image by the image processing, and detect the pair of outlines formed by the peripheral surface with respect to the central axis.

A measurement point input step S3 is a process of designating a first measurement point 26 and a second measurement point 27 on the first and second outlines 24a and 24b, which are obtained by the outline detection step S2, of one of the viewpoint images, for example, the left viewpoint image 21L. To designate the first and second measurement points 26 and 27, operation from the input operation unit 9, e.g. a cursor operation using a mouse or a touch operation to the touch panel integrated in the image display 16 is required. Note that, in a case where a position in the vicinity of each of the two outlines detected by the outline detection step S2 is designated as the measurement point, the measurement point is automatically corrected to a position on the outline and inputted. In a case where a position far away from each of the two outlines detected by the outline detection step S2 is designated as the measurement point, an error message is displayed to suggest re-performance of the input operation of the measurement point.

According to a corresponding point deriving step S4, when the measurement points 26 and 27 are designated in the left viewpoint image 21L, corresponding points 28 and 29 are automatically set on the outlines 25a and 25b of the right viewpoint image 21R by the stereo matching process. In the following parallax calculation step S5, the parallax between the left and right viewpoint images 21L and 21R with respect to the central axis of the cylindrical object 4 is calculated from the coordinates of the central axis of the left viewpoint image 21L calculated based on the measurement points 26 and 27 and the coordinates of the central axis calculated from the right viewpoint image 21R in a like manner.

To calculate the parallax, it is necessary to calculate the coordinates of the central axis in each viewpoint image. A concrete method for the calculation is as follows. First, as shown in FIG. 6, in a case where a point A and a point B situated on a surface 31 of projection (corresponding to an imaging surface of an image sensor) of the left viewpoint image 21L are a pair of measurement points situated on the outlines that the peripheral surface of the cylindrical object 4 forms on its side, the coordinates C of the central axis passing through the center of a cylinder can be obtained.

Figure 6:
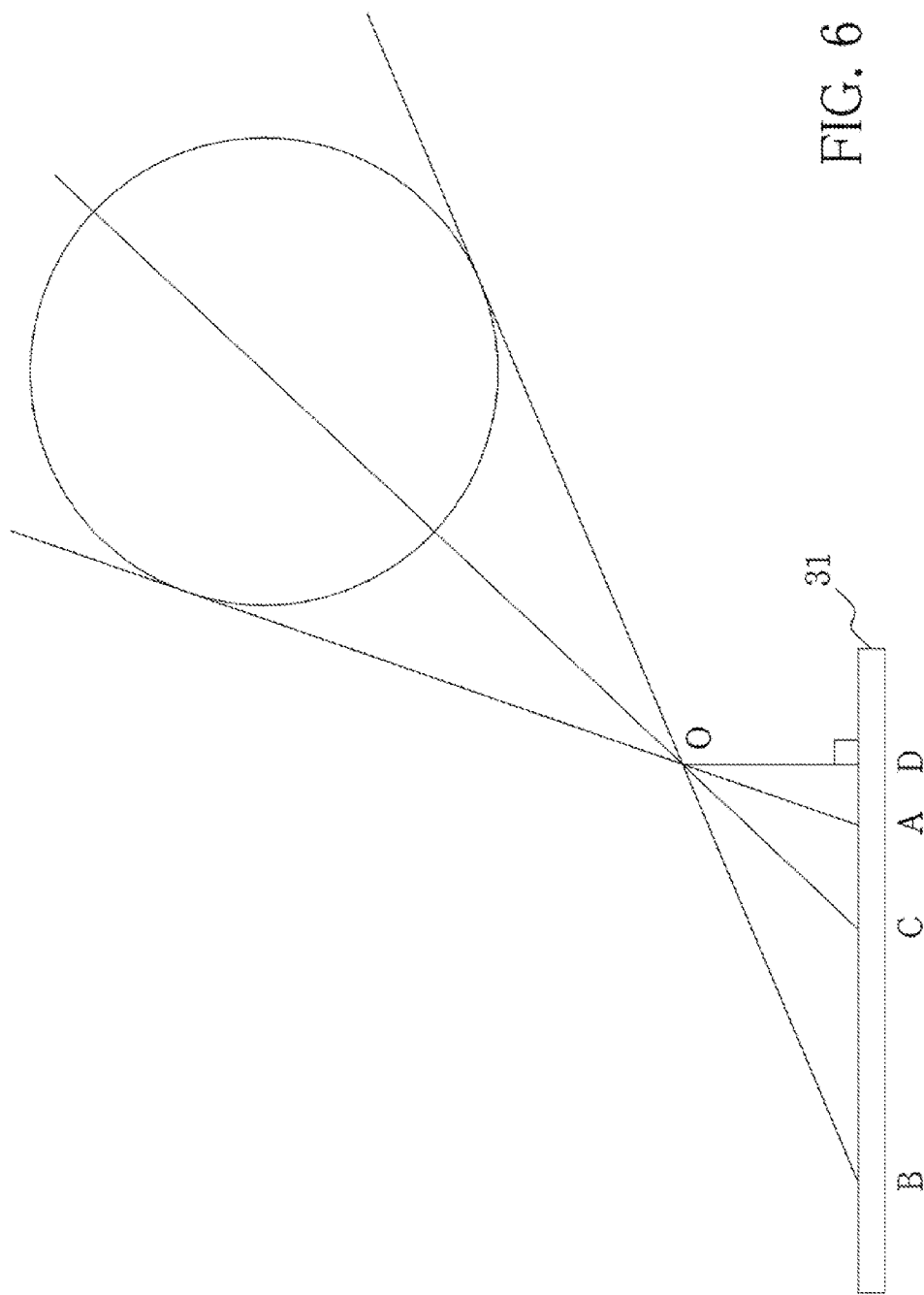
FIG. 6 is an explanatory view in deriving the coordinates of a central axis of the cylindrical object from a pair of measurement points.

In FIG. 6, OD, DA, and DB can be obtained from a focal length of the lens 1a, a pixel size, a pixel number, and the like, and then OA and OB can be obtained using the Pythagorean theorem. Moreover, OA:OB=AC:BC derives the coordinates of C using OA, OB, and AB. The same steps are applied to the right viewpoint image 21R, and therefore it is possible to obtain the parallax between the left and right viewpoint images with respect to the position of the central axis of the cylindrical object 4, by using the obtained coordinates of the central axes in the two viewpoint images.

In a diameter calculation step S6, the coordinates of the central axis and the diameter of the approximate cylinder, being an object to be measured, can be calculated from the pair of measurement points 26 and 27 inputted in the measurement point input step S3, the pair of corresponding points 28 and 29 calculated in the corresponding point deriving step S4, and the parallax between the two viewpoint images with respect to the positions of the central axes obtained in the parallax deriving step S5.

Figure 7:
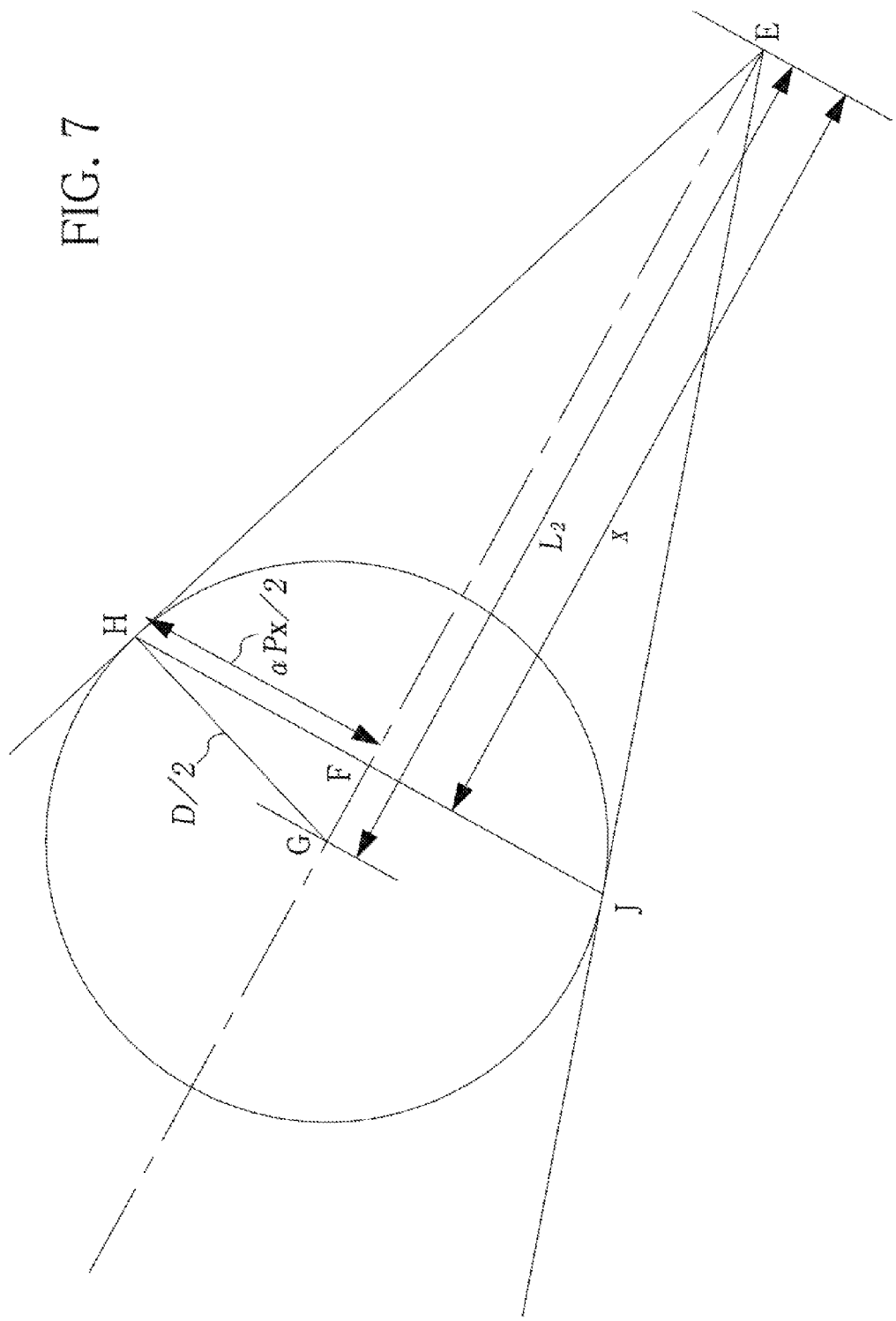
FIG. 7 is an explanatory view of a method for calculating the diameter of the cylindrical object.

FIG. 7 shows a three-dimensional system in taking one of the viewpoint images. In FIG. 7, E corresponds to a focus O. J represents a point in the peripheral surface of the cylindrical object 4, corresponding to the point A. H represents a point in the peripheral surface of the cylindrical object 4, corresponding to the point B. F is a midpoint between J and H. G represents the central axis of the cylindrical object 4. x represents the distance of EF, and $L_2$ represents the distance of EG. At this time, the angle FHE=the angle FGH by a theorem about a tangent of a circle and the angle EFH=the angle HFG=90°, so the triangle EFH and the triangle HFG are geometrically similar. Accordingly, EF:FH=HF:FG, and the following mathematical expression (1) is derived.

$$x : \frac{\alpha P x}{2} = \frac{\alpha P x}{2} : L_2 - x \quad (1)$$

Wherein, P is the number of pixels between the two points on the outlines, and α is a coefficient for converting the pixel number P into the length HJ on condition that the distance EF is x. The value of a can be calculated based on the object distance and an imaging magnification contained in the tag data, which is attached to each parallax image data stored to the data memory 17.

Organizing the mathematical expression (1) derives the following mathematical expression (2).

$$x = \frac{4L_2}{\alpha^2 P^2 + 4} \quad (2)$$

Thus, it is known that the distance x between E and F can be calculated from the distance $L_2$ between E and G, which is obtained from the coordinates of the central axes in the two viewpoint images and the parallax calculated in the parallax deriving step S5.

The distance D of the cylindrical object 4, being an object whose diameter is to be measured, can be expressed by the following mathematical expression (3) using the Pythagorean theorem in the triangle HFG.

$$D = 2\sqrt{(L_2 - x)^2 + \left(\frac{\alpha P x}{2}\right)^2} \quad (3)$$

Using the mathematic expressions (2) and (3) can calculate the diameter D of the cylindrical object 4.

By the way, in the calculation process of the diameter D, the first and second measurement points 26 and 27 are necessarily inputted in the left viewpoint image 21L, but the first and second measurement points 26 and 27 are not necessarily set at positions horizontal to each other. Taking FIG. 5 as an example, it is desirable that the measurement points 26 and 27 are designated so as to minimize a mutual distance between the measurement points 26 and 27, in other words, be horizontal to each other, but this is difficult in actual fact. To reduce an error in calculation of the diameter D, it is preferable to set the measurement points 26 and 27 horizontally.

Considering above, a measurement point update step (S7 to S12) is provided. In this measurement point update step, while the measurement point 26, being one of the first and second measurement points 26 and 27 designated in the left viewpoint image 21L is fixed, the other measurement point 27 is scanned along the outline 24b. At this time, the corresponding point 29 in the right viewpoint image 21R is shifted in synchronization with the scan of the measurement point 27 in the left viewpoint image 21L by the stereo matching process. Whenever the measurement point 27 and the corresponding point 29 are shifted, the diameter calculation step is repeated in the above procedure, and the calculation results of the coordinates of the central axes of the cylinder and the diameter are saved sequentially. Note that, while the measurement point 27 is fixed, the other measurement point 26 may be scanned along the outline 24a. In this case, the corresponding point 28 is scanned in the right viewpoint image 21R in a synchronized manner.

In the step S7, in the course of sequentially calculating the diameter D, saving a smaller value has higher priority than saving a larger value. In the steps S8 to S10, if a latter diameter D calculated afterward is enough larger than a former diameter D calculated before, the direction of the scan is judged to be opposite and hence is changed to an appropriate predetermined direction. Also, in the step S8, in a case where a newly calculated diameter D is larger than a former calculation value and its increment is smaller than a minute amount A, it is judged that a minimum value of the diameter D is calculated just moments before the calculation of the new diameter D. The steps S11 and S12 carry out a process for sequentially updating the minimum value of the diameter D.

While the measurement point 27 is scanned in the appropriated direction, if it is detected in the step S8 that a new value of the diameter D is increased from a former value by a degree less than the minute amount A, the step S13 judges that the former value is the minimum value of the diameter D. Note that, FIG. 8 is a plot of the diameter D that is calculated while the measurement point 27 is scanned on the outline 24b.

Figure 8:
FIG. 8 is a graph showing the correlation between the coordinates of the measurement point and the calculated diameter.

The correlation of FIG. 8 represents how a cross section that is used for measurement of the diameter is taken in the cylindrical object 4. The cross section becomes a perfect circle if the central axis of the cylinder is orthogonal to the cross section, and a correct diameter is calculated in the diameter calculation step S6. On the other hand, the cross section becomes an ellipse, if central axis is not orthogonal to the cross section. The more the cross section is inclined with respect to the central axis, the longer major axis the ellipse has.

The major axis of the ellipse is calculated as the diameter D of the cylindrical object 4, in the diameter calculation step S6. Thus, out of the diameters D obtained by scanning the measurement point 27 in a measurement point shift step, the minimum value is most suitably adopted as the diameter D of the cylindrical object 4. Note that, at the time of completing a sequence of the calculation process, the diameter D calculated in each scan position of the measurement point may be displayed on the image display 16 in a list form with being associated with the coordinates of the scanned measurement point.

By the way, in a case where the cylindrical object 4 is not directly opposed as shown in the left and right viewpoint images 32L and 32R of FIG. 9, out of measurement points 42 and 43 designated on outlines 33 and 34 of the left viewpoint image 32L, the measurement point 43 having a short object distance is fixed and the measurement point 42 having a long object distance is preferably scanned to a direction of decreasing the object distance. This is because in calculating three-dimensional information from the parallax image, a short object distance has a precision advantage. Also in the right viewpoint image 32, the position of the corresponding position 44 is sequentially shifted in synchronization with the scan of the measurement point 42.

Figure 10A:
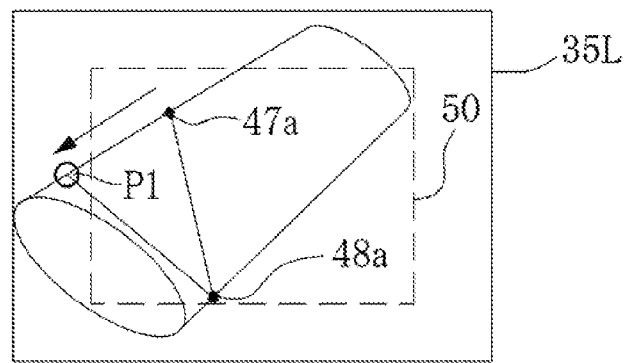
FIG. 10A is an explanatory view in the case of normally scanning one of the measurement points.

As for the scan of the measurement point, the following improvement is effective. In a left viewpoint image 35L shown in FIG. 10A, provided that a measurement point 47a being on a scanned side is shifted toward a scan position P1, while a measurement point 48a is on a fixed side, if a measurement frame 50 is set in advance in the display screen, the scan of the measurement point is banned outside the measurement frame 50. The measurement frame 50 is determined in contemplation of image distortion that tends to occur in a periphery of the screen, in consideration of a property of a general imaging optical system including the stereo camera 1. The size of the measurement frame is preferably variable in accordance with measurement precision.

Figure 10B:
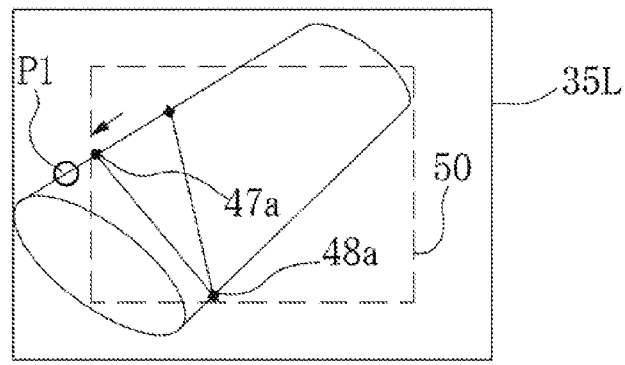
FIG. 10B is an explanatory view in a case where the scan of the measurement point is regulated with a measurement frame.
Figure 10C:
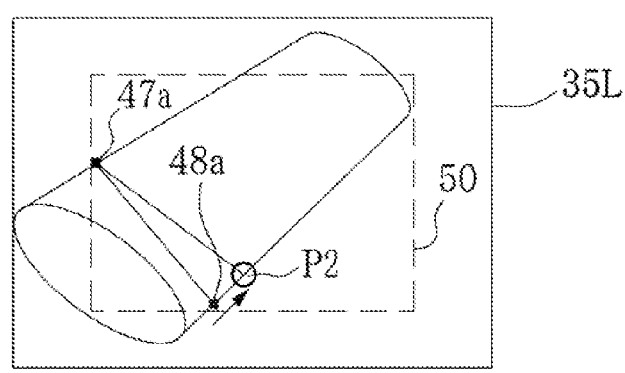
FIG. 10C is an explanatory view in a case where the measurement point to be scanned is changed.
Figure 11:
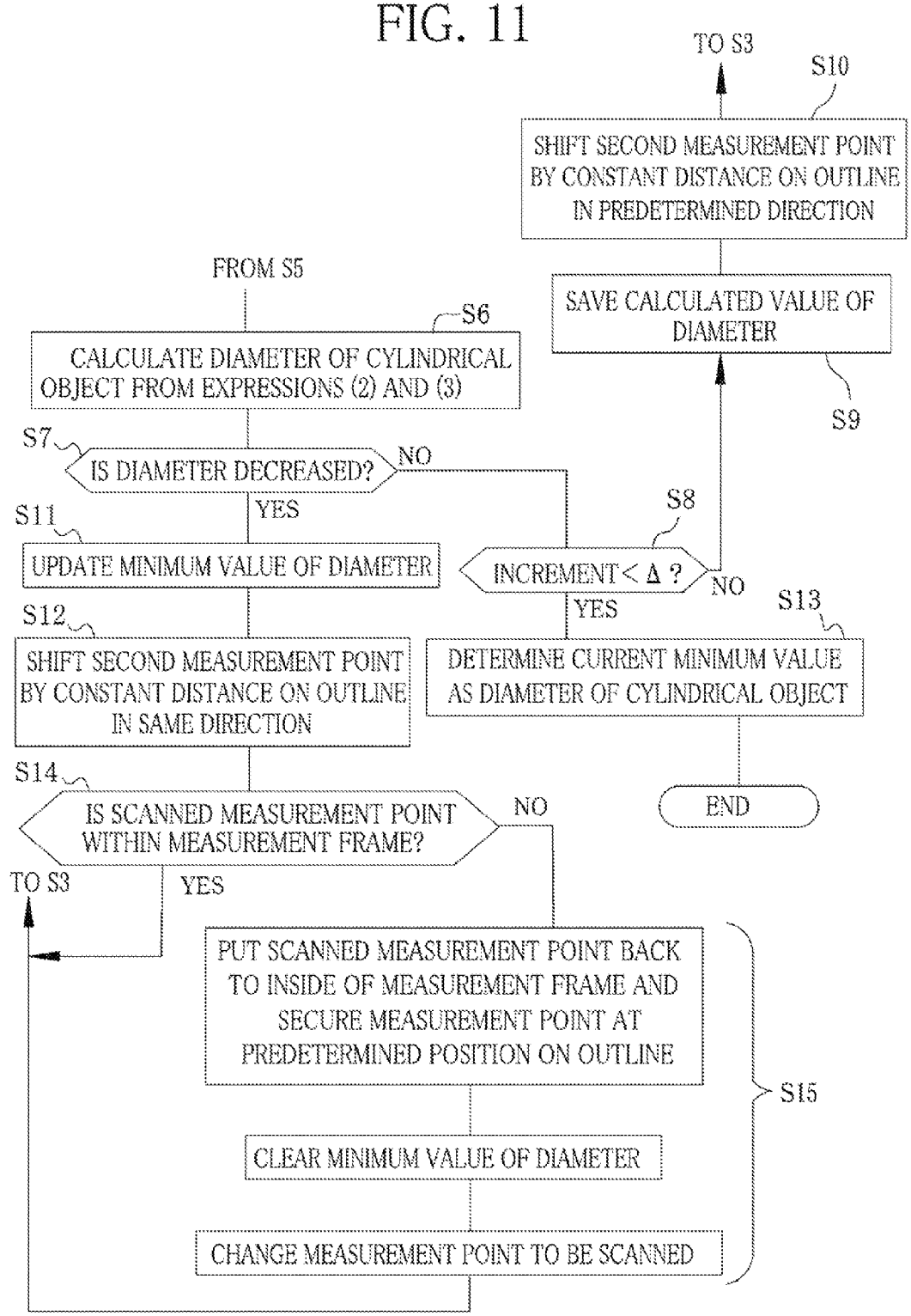
FIG. 11 is a flowchart showing an example of a process in changing the measurement point to be scanned.

The measurement point 47a is scanned toward the scan position P1 at which the diameter D becomes its minimum, in a normal operation. In the course of the scan, as shown in FIG. 10B, when arrival of the measurement point 47a at a border of the measurement frame 50 is detected at a measurement frame detection step S14 shown in a flowchart of FIG. 11, and thus a scanned-side measurement point switching process S15 is performed. In the scanned-side measurement point switching step S15, the measurement point 47a is fixed on the border of the measurement frame 50 at that point in time, and the minimum value of the diameter D calculated before then is cleared. Then, the other measurement point 48a is switched to a measurement point on a scanned side. The measurement point 48a is shifted from an initially designated position along its border, and is finally scanned to a scan position P2 at which the minimum value of the diameter D is obtained. Note that, the right viewpoint image is omitted in the drawing, but the switching of the corresponding points between the fixed side and the scanned side is performed, in synchronization with the switching of the measurement points 47a and 48a as shown in FIGS. 10A to 10C.

The switching step of the measurement points between the fixed side and the scanned side can be also carried out by the following method. First, in FIG. 10A, the measurement point 47a to be scanned is shifted across the measurement frame 50. The diameter D becomes its minimum at that point in time when the measurement point 47a reaches the scan position P1, and the scan position of the measurement point 47a at the time is checked. In a case where the scan position is outside the measurement frame 50, the measurement point 47a is drawn back to the border of the measurement frame 50, and fixed there as the measurement point 47a on the fixed side. Then, the other measurement point 48a is switched to the scanned side, and scanned along its outline to the scan position P2.

Figure 12:
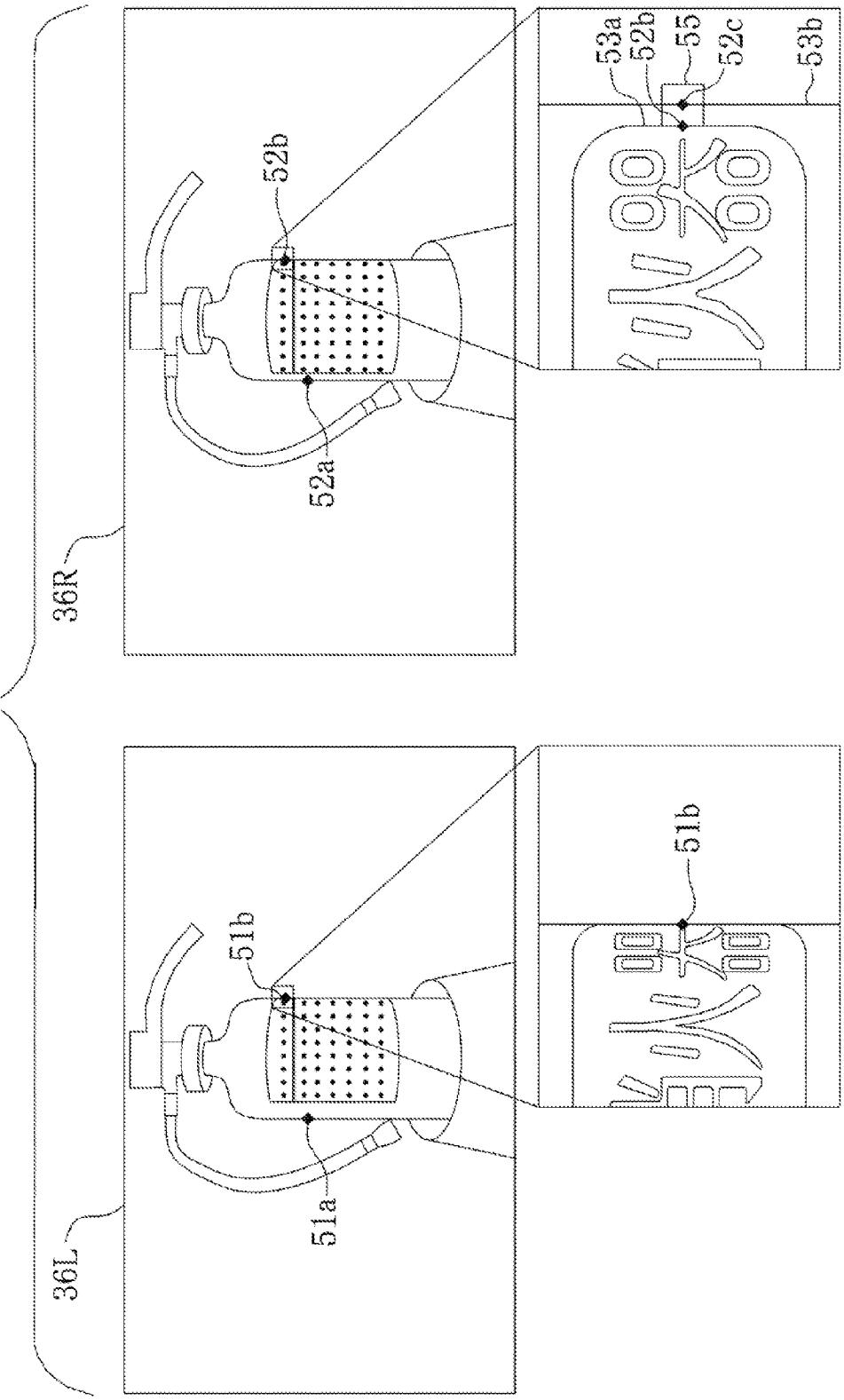
FIG. 12 is an explanatory view showing a state of updating a corresponding point that is mistakenly set in a right viewpoint image.

Next, an operation that is effective at preventing the wrong setting of the corresponding point will be described. The first and second measurement points are designated in the right viewpoint image, and the corresponding points are automatically set based on the first and second measurement points by the stereo matching process in the right viewpoint image. At this time, the wrong setting of the corresponding points may occur depending on the set position of the measurement points. For example, FIG. 12 shows a state in which first and second measurement points 51a and 51b are designated on outlines of a peripheral surface of a fire extinguisher, being imaged in a left viewpoint image 36L as an object whose diameter is to be measured.

Figure 13:
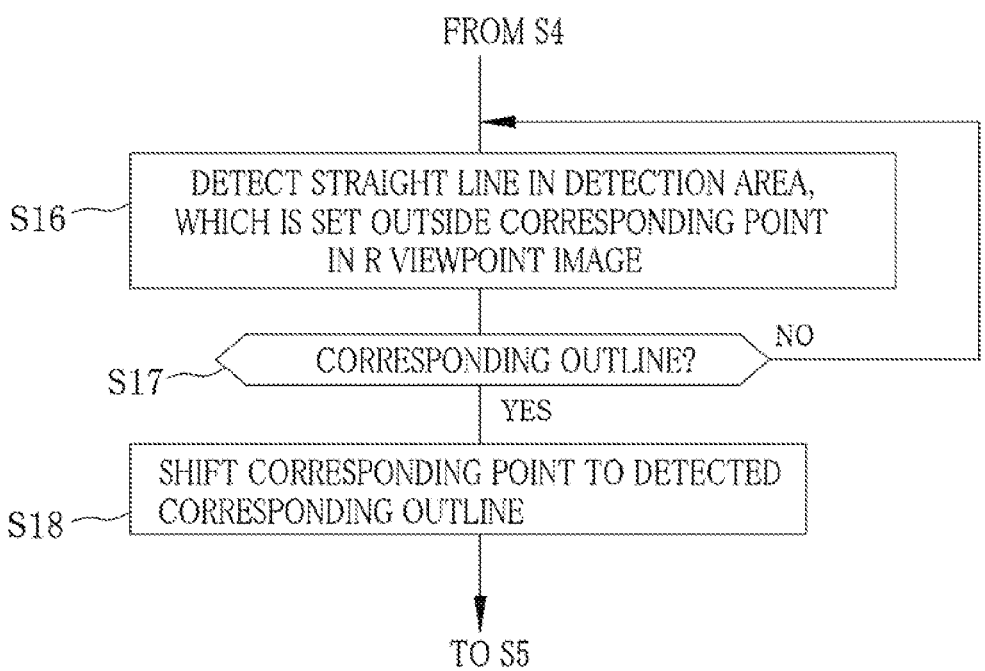
FIG. 13 is a flowchart showing an example of a process of preventing the wrong setting of the corresponding point in the right viewpoint image.

On the other hand, in a right viewpoint image 36R of this fire distinguisher, corresponding points 52a and 52b are derived by the stereo matching process in accordance with the positions of the measurement points 51a and 51b. Magnifying the measurement point 52a and the corresponding point 52b corresponding thereto, while the measurement point 51b is set appropriately on the outline, the corresponding point 52b is set on a vertical line of a label stuck on the front of the fire extinguisher, which is misidentified as a corresponding outline 53a. Calculating the diameter D in this state brings a value smaller than an actual value, and causes deterioration in measurement precision. To prevent this, a corresponding outline detection step as shown in FIG. 13 is effectively used.

In the corresponding outline detection step, a detection area of a certain width is set on the outside of each corresponding point so as to protrude to the outside of an image of the cylindrical object, with respect to the corresponding points 52a and 52b set in accordance with the measurement points 51a and 51b, and a straight line is detected in this detection area. As an example, FIG. 12 shows a state in which a detection area 55 is set on the outside of the corresponding point 52b. A straight line is detected in this detection area 55, and it is judged whether or not the detected straight line is a corresponding outline that corresponds to the outline on which the measurement point 51b is set. In a case where the detected straight line is confirmed to be the corresponding outline 53a, the wrongly set corresponding point 52b is automatically updated to a correct corresponding point 52c shifted on the corresponding outline 53a.

Note that, if the detection area 55 is too wide, another straight line (vertical line in this embodiment) in a background may be mistakenly detected, so it is preferable to keep the width of the detection area in a horizontal direction within the appropriate confines, e.g. of the order of 50 pixels in this embodiment. As for the vertical direction, setting the detection area to have a length corresponding to the outline detected in the left viewpoint image 36L is effective at judging whether the detected straight line is just a pattern line or a corresponding outline.

Figure 14:
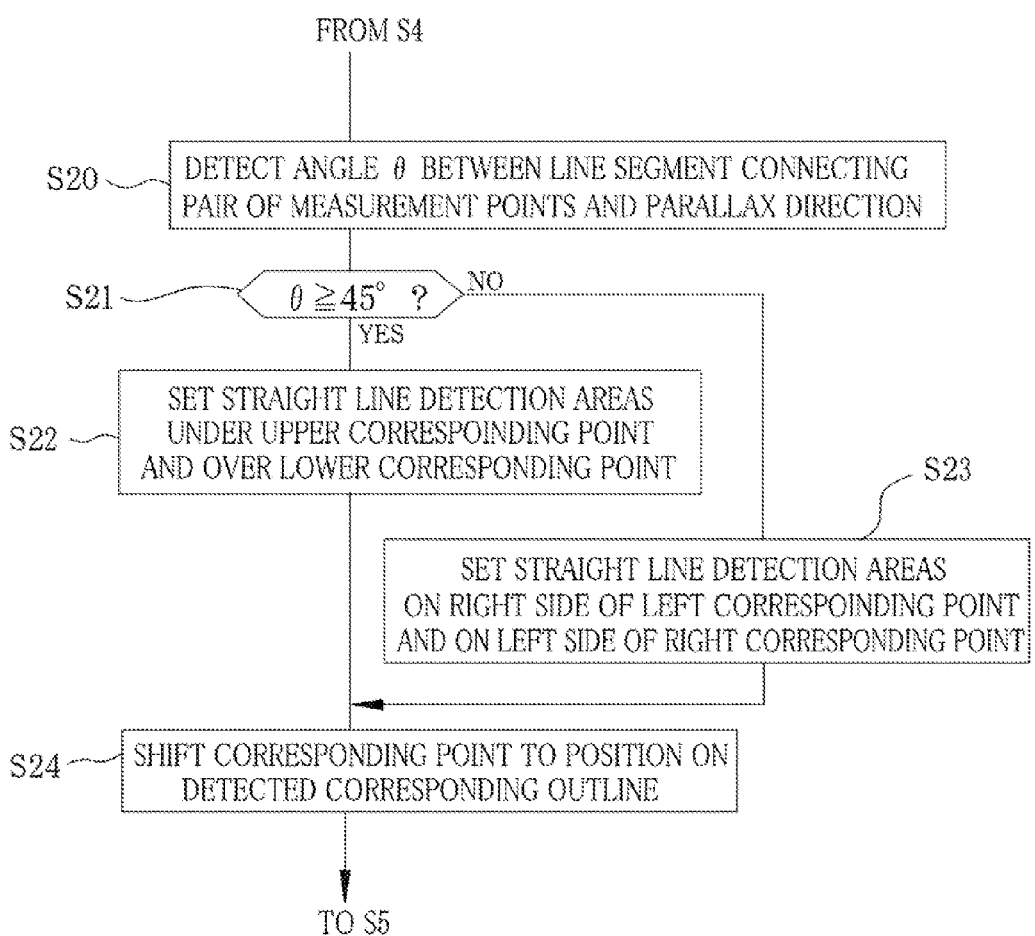
FIG. 14 is a flowchart showing an example of a process of preventing the wrong setting of the corresponding point due to a background pattern.

Oppositely to the above embodiment, a straight line in a background may be mistakenly detected as a corresponding outline, when the corresponding points are derived after the designation of the measurement points. To prevent this, a corresponding outline detection process of FIG. 14 is effective. In this corresponding outline detection step, when a pair of measurement points is set, an angle θ formed between a line segment connecting the measurement points and a parallax direction is checked in step S20. The parallax direction is a horizontal direction in the above embodiment, and coincides with a horizontal array direction of the pixels in the imaging surface. Note that, the angle θ does not have a direction, and a smaller angle (an acute angle) is used as the angle θ, out of angles that are formed between the line segment connecting the pair of measurement points and the horizontal direction.

Figure 15A:
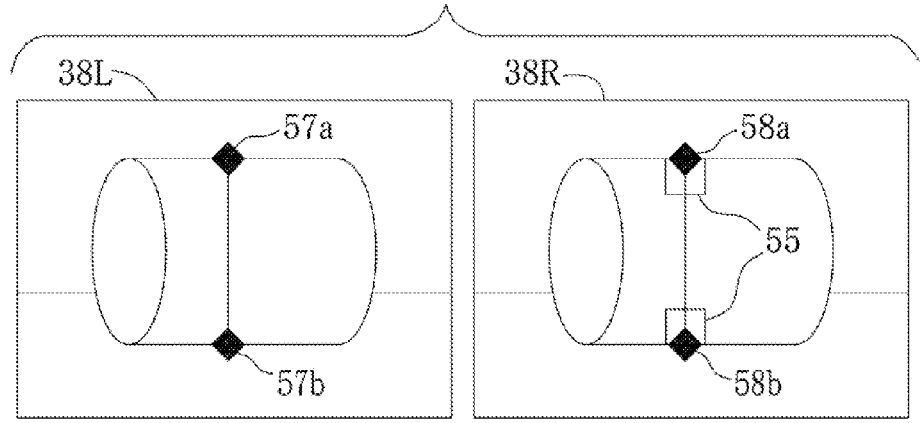
FIG. 15A is an explanatory view in deriving the corresponding point without being influenced by a vertical line in a background.

Step S21 judges whether or not the angle θ is 45° or more. Operation branches to step S22 or step S23, according to whether or not the angle θ is 45° or more. The step S22 corresponds to the case of designating measurement points 57a and 57b in a left viewpoint image 38L as shown in FIG. 15A. In this case, as to corresponding points 58a and 58b derived in a right viewpoint image 38R, the detection areas 55 of a certain width are set under the corresponding point 58a positioned in an upper portion of the screen, and over the corresponding point 58b positioned in a lower portion of the screen.

Since the detection areas 55 are set like this, no detection area is set outside an image of a cylindrical object, in other words, in the background. Therefore, even if a vertical parallel line segment in the background is wrongly detected in the right viewpoint image 38R by a malfunction of the stereo matching process, reconfirming a straight line detected in the detection area 55 detects a correct corresponding outline and the corresponding point 58a, 58b is re-set on the corresponding outline.

Figure 15B:
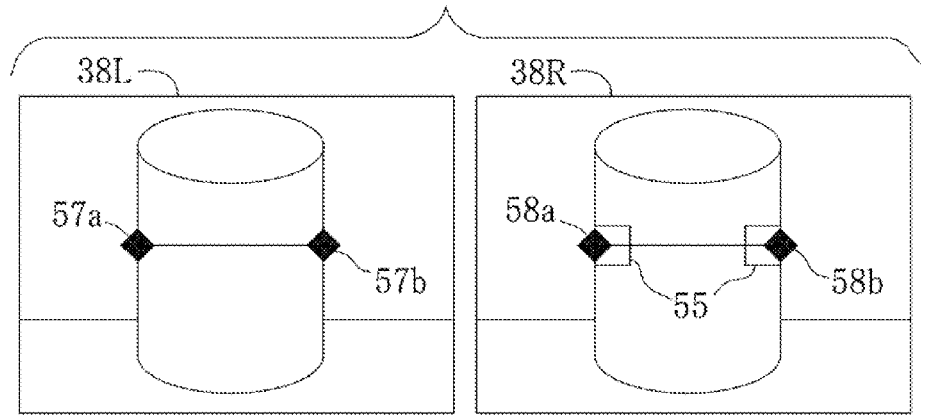
FIG. 15B is an explanatory view in deriving the corresponding point without being influenced by a horizontal line in the background.

Likewise, operation of the step S23, which is performed in a case where the angle θ is less than 45°, corresponds to the case of designating measurement points 57a and 57b in the left viewpoint image 38L as shown in FIG. 15B. In this case, as to corresponding points 58a and 58b derived in the right viewpoint image 38R, the detection areas 55 of the certain width are set on the right side of the corresponding point 58a positioned in a left portion of the screen, and on the left side of the corresponding point 58b positioned in a right portion of the screen. Setting the detection areas 55 in this manner facilitates detecting the correct corresponding outlines without being influenced by the background, and is effective at preventing the wrong setting of the corresponding points 58a and 58b.

Figure 15C:
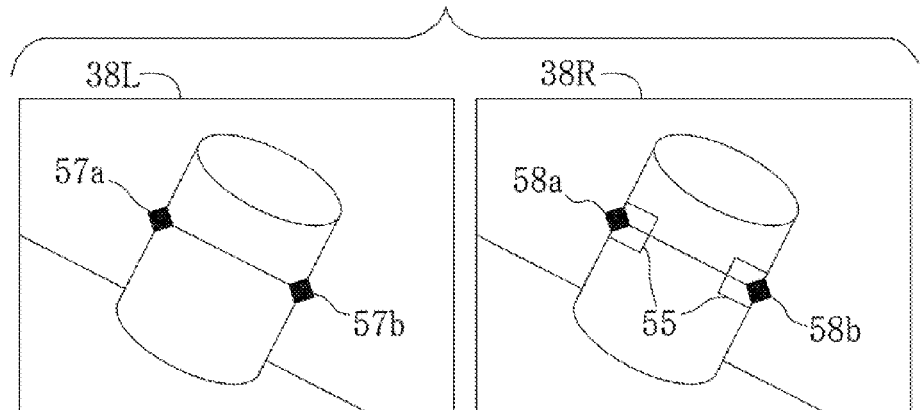
FIG. 15C is an explanatory view in deriving the corresponding point without being influenced by an oblique line in the background.

It is conceivable in most cases that the angle θ of the line segment connecting the pair of measurement points 57a and 57b is nearly 90° or 0° as shown in FIG. 15A or 15B, but the above processes are effectively usable in a case shown by FIG. 15C, for example. In the case of FIG. 15C, a line segment connecting the measurement points 57a and 57b has an angle of the order of 30°. In this case, the detection areas 55 are set on the lower right side of the corresponding point 58a positioned in a left portion, and on the upper left side of the corresponding point 58b positioned in a right portion. The detection area 55 is preferably set in an inclined manner in accordance with the angle θ such that the detection area 55 does not lie off the outline of the cylindrical object 4. The inclination angle can be determined in accordance with the angle θ of the line segment connecting the measurement points 57a and 57b.

The present invention is not limited to the embodiments described above. For example, the number of imaging viewpoints is not two, but may be increased to three or more with maintaining the parallax direction, in order to increase the measurement precision. Instead of using one camera having two imaging viewpoints, two or more monocular cameras may be used. Otherwise, if the object whose diameter is to be measured is put still, a plurality of exposures may be made with shifting one camera in the parallax direction to obtain a plurality of viewpoint images. The above embodiments are mainly described about a measuring device, but the present invention is effectively usable as a measuring method or a measuring program.

Although the present invention has been fully described by the way of the preferred embodiment thereof with reference to the accompanying drawings, various changes and modifications will be apparent to those having skill in this field. Therefore, unless otherwise these changes and modifications depart from the scope of the present invention, they should be construed as included therein.

What is claimed is:

1. A diameter measuring device of a cylindrical object, the diameter measuring device including a computer that performs a program stored in a program memory, the diameter measuring device comprising:
    a parallax image storage, in the program memory, for storing a first viewpoint image and a second viewpoint image obtained by imaging said cylindrical object from a first viewpoint and a second viewpoint, respectively;
    a parallax image display for displaying said first viewpoint image and said second viewpoint image;
    an outline detector, performed by the computer, for detecting in said first viewpoint image a first outline and a second outline of said object that are parallel to a central axis of said object;
    a measurement point designator, performed by the computer, for designating a first measurement point and a second measurement point on said first and second outlines, respectively;
    a corresponding point deriver, performed by the computer, for setting in said second viewpoint image a first corresponding point and a second corresponding point that correspond to said first and second measurement points;
    a measurement point updater, performed by the computer, for scanning said second measurement point on said second outline while fixing said first measurement point, and updating said second corresponding point whenever said second measurement point is updated in accordance with a scan position; and
    a diameter calculator, performed by the computer, for calculating a diameter of said object whenever said measurement point updater performs the update, and determining a minimum value of said calculated diameters as said diameter of said object.

2. The diameter measuring device of the cylindrical object according to claim 1, wherein out of a pair of measurement points set in said first viewpoint image, one having a shorter object distance is designated as said first measurement point.

3. The diameter measuring device of the cylindrical object according to claim 1, wherein in a case where in a course of scanning said second measurement point, said second measurement point is across a first measurement frame set in advance in said first viewpoint image or said second corresponding point is across a second measurement frame set in advance in said second viewpoint image, said measurement point updater fixes said second measurement point on said second outline of said first viewpoint image such that said second measurement point and said second corresponding point are confined within said first measurement frame and said second measurement frame, respectively, and updates said first measurement point while scanning said first measurement point on said first outline, and sequentially updates said first corresponding point in said second viewpoint image.

4. The diameter measuring device of the cylindrical object according to claim 1, wherein when said measurement point designator designates said first and second measurement points on said first and second outlines of said first viewpoint image, said corresponding point deriver derives said first and second corresponding points corresponding to said first and second measurement points, respectively, in said second viewpoint image by a stereo matching process, and retrieves a first corresponding outline and a second corresponding outline of said second viewpoint image that correspond to said first and second outlines in straight line detection areas having a certain width each of which is set in each of extending directions of a line segment connecting said first and second corresponding points, and updates positions of said first and second corresponding points to positions on said detected first and second corresponding outlines.

5. The diameter measuring device of the cylindrical object according to claim 1, wherein
    after said measurement point designator designates said first and second measurement points on said first and second outlines of said first viewpoint image, said corresponding point deriver derives said first and second corresponding points corresponding to said first and second measurement points, respectively, in said second viewpoint image by a stereo matching process;
    said corresponding point deriver changes orientations of straight line detection areas having a certain width that are set adjacently to said first corresponding point and said second corresponding point of said second viewpoint image based on a line segment connecting said first measurement point and said second measurement point or an angle θ of a line segment connecting said first corresponding point and said second corresponding point relative to a parallax direction;
    said corresponding point deriver retrieves in said straight line detection areas a first corresponding outline and a second corresponding outline of said second viewpoint image that correspond to said first and second outlines; and
    said corresponding point deriver updates positions of said first and second corresponding points to positions on said detected first and second corresponding outlines.

6. The diameter measuring device of the cylindrical object according to claim 5, wherein
    in a case where said angle θ is 45° or more, said straight line detection area is set under an upper corresponding point and over a lower corresponding point out of said first and second corresponding points; and
    in a case where said angle θ is less than 45°, said straight line detection area is set on a right side of a left corresponding point and on a left side of a right corresponding point out of said first and second corresponding points.

7. A diameter measuring method of a cylindrical object comprising the steps of:
storing a first viewpoint image and a second viewpoint image obtained by imaging said cylindrical object from a first viewpoint and a second viewpoint;
displaying said first viewpoint image and said second viewpoint image;
detecting in said first viewpoint image a first outline and a second outline of said object that are parallel to a central axis of said object;
designating a first measurement point and a second measurement point on said first and second outlines, respectively;
deriving in said second viewpoint image a first corresponding point and a second corresponding point that correspond to said first and second measurement points;
scanning said second measurement point on said second outline while fixing said first measurement point, and updating said second corresponding point whenever said second measurement point is updated in accordance with a scan position; and
calculating a diameter of said object whenever the update is performed, and determining a minimum value of said calculated diameters as said diameter of said object,
wherein the method is performed using a computer.

8. The diameter measuring method according to claim 7, wherein out of a pair of measurement points set in said first viewpoint image, one having a shorter object distance is designated as said first measurement point.

9. The diameter measuring method according to claim 8, wherein in the updating step of said second corresponding point, in a case where in a course of scanning said second measurement point, said second measurement point is across a first measurement frame set in advance in said first viewpoint image or said second corresponding point is across a second measurement frame set in advance in said second viewpoint image, said second measurement point is fixed on said second outline of said first viewpoint image such that said second measurement point and said second corresponding point are confined within said first measurement frame and said second measurement frame, respectively, and said first measurement point is updated while said first measurement point is scanned on said first outline, and said first corresponding point is sequentially updated in said second viewpoint image.

10. The diameter measuring method according to claim 7, wherein the deriving step of said first and second corresponding points further includes the steps of:
deriving said first and second corresponding points in said second viewpoint image by a stereo matching process, said first and second corresponding points corresponding to said first and second measurement points, respectively, designated on said first and second outlines of said first viewpoint image;
retrieving in said second viewpoint image a first corresponding outline and a second corresponding outline that correspond to said first and second outlines within straight line detection areas having a certain width, each of said straight line detection areas being set in each of extending directions of a line segment connecting said first and second corresponding points; and
updating positions of said first and second corresponding points to positions on said detected first and second corresponding outlines.

11. The diameter measuring method according to claim 7, wherein the deriving step of said first and second corresponding points further includes the steps of:
deriving said first and second corresponding points that correspond to said first and second measurement points designated in the designating step on the first and second outlines of said first viewpoint image, by a stereo matching process;
changing an orientation of a straight line detection area having a certain width that is set adjacently to each of said first corresponding point and said second corresponding point of said second viewpoint image, based on a line segment connecting said first measurement point and said second measurement point or an angle θ of a line segment connecting said first corresponding point and said second corresponding point relative to a parallax direction; and
retrieving a first corresponding outline corresponding to said first outline and a second corresponding outline corresponding to said second outline in said straight line detection areas of said second viewpoint image; and
updating positions of said first and second corresponding points to positions on said detected first and second corresponding outlines.

12. The diameter measuring method according to claim 11, wherein
in a case where said angle θ is 45° or more, said straight line detection area is set under an upper corresponding point and over a lower corresponding point out of said first and second corresponding points; and
in a case where said angle θ is less than 45°, said straight line detection area is set on a right side of a left corresponding point and on a left side of a right corresponding point out of said first and second corresponding points.

* * * * *